US011019538B2

(12) United States Patent
Stojanovski et al.

(10) Patent No.: US 11,019,538 B2
(45) Date of Patent: May 25, 2021

(54) SYSTEMS, METHODS AND DEVICES FOR LEGACY SYSTEM FALLBACK IN A CELLULAR COMMUNICATIONS SYSTEM

(71) Applicant: APPLE INC., Cupertino, CA (US)

(72) Inventors: Alexandre Saso Stojanovski, Paris (FR); Sudeep Palat, Cheltenham Gloucestershire (GB); Pingping Zong, Randolph, NJ (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/489,279

(22) PCT Filed: Jun. 12, 2018

(86) PCT No.: PCT/US2018/037084
§ 371 (c)(1),
(2) Date: Aug. 27, 2019

(87) PCT Pub. No.: WO2018/231813
PCT Pub. Date: Dec. 20, 2018

(65) Prior Publication Data
US 2020/0015128 A1 Jan. 9, 2020

Related U.S. Application Data

(60) Provisional application No. 62/518,846, filed on Jun. 13, 2017.

(51) Int. Cl.
*H04W 36/00* (2009.01)
*H04W 76/25* (2018.01)
(Continued)

(52) U.S. Cl.
CPC ........ *H04W 36/0022* (2013.01); *H04W 8/08* (2013.01); *H04W 60/005* (2013.01);
(Continued)

(58) Field of Classification Search
CPC . H04W 36/0022; H04W 76/25; H04W 76/50; H04W 8/08; H04W 60/005; H04W 80/10
See application file for complete search history.

(56) References Cited

U.S. PATENT DOCUMENTS

2011/0141886 A1* 6/2011 Lee ................ H04L 47/805
370/230
2016/0234744 A1* 8/2016 Wu ................ H04W 76/18
(Continued)

FOREIGN PATENT DOCUMENTS

EP        3197209 A1      7/2017
WO   WO-2013110293 A1 *  8/2013  ............ H04W 76/50

OTHER PUBLICATIONS

3GPP TS 2.221, "3rd Generation Partnership Project; Technical Specification Group Services and System Aspects; Architectural requirements (Release 15)", V15.0.0, Sep. 2018, 53 pages.
(Continued)

*Primary Examiner* — Harry H Kim
(74) *Attorney, Agent, or Firm* — Stoel Rives LLP

(57) ABSTRACT

User equipment (UEs) can fallback to a legacy system, such as an evolved packet system (EPS), from a fifth generation system (5GS). For example, a UE camps on the 5GS network by default. When an indicator of a voice call is detected, the UE performs a fallback to EPS for a duration of the voice call. After the voice call, the UE can return to the 5GS. In another example, the UE detects an emergency session request (e.g., internet protocol multimedia subsystem (IMS) emergency session request). The UE performs a fallback to EPS for a duration of the emergency session. After the emergency session is complete, the UE can return to the 5GS. The solution can operate with UEs that operate in either Single Registration (SR) mode embodiments or Dual Registration (DR) mode embodiments. Depending on
(Continued)

the embodiment, the UE can perform a handover or redirection to the legacy system (such as E-UTRAN).

12 Claims, 11 Drawing Sheets

(51) Int. Cl.
  *H04W 76/50* (2018.01)
  *H04W 8/08* (2009.01)
  *H04W 60/00* (2009.01)
  *H04W 80/10* (2009.01)
(52) U.S. Cl.
  CPC ........... *H04W 76/25* (2018.02); *H04W 76/50* (2018.02); *H04W 80/10* (2013.01)

(56) References Cited

U.S. PATENT DOCUMENTS

| | | | |
|---|---|---|---|
| 2017/0332300 A1 | 11/2017 | Choi et al. | |
| 2018/0132141 A1* | 5/2018 | Huang-Fu | H04L 65/1063 |
| 2018/0227809 A1* | 8/2018 | Nair | H04W 12/106 |
| 2018/0324877 A1* | 11/2018 | Tiwari | H04W 48/18 |
| 2018/0376384 A1* | 12/2018 | Youn | H04W 36/14 |
| 2019/0289506 A1* | 9/2019 | Park | H04W 76/27 |

OTHER PUBLICATIONS

3GPP TS 23.237, "3rd Generation Partnership Project; Technical Specification Group Services and System Aspects; IP Multimedia Subsystem (IMS) Service Continuity; Stage 2 (Release 15)", V15.1.0, Dec. 2017, 182 pages.

3GPP TS 23.292, "3rd Generation Partnership Project; Technical Specification Group Services and System Aspects; IP Multimedia Subsystem (IMS) centralized services; Stage 2 (Release 14)", V14.2.0, Mar. 2017, 137 pages.

3GPP TS 23.501, "3rd Generation Partnership Project; Technical Specification Group Services and System Aspects; System Architecture for the 5G System; Stage 2 (Release 15)", V15.1.0, Mar. 2018, 201 Pages.

3GPP Ts 23.502, "3rd Generation Partnership Project; Technical Specification Group Services and System Aspects; Procedures for the 5G System; (Stage 2 (Release 15)", V15.1.0, Mar. 2018, 285 pages.

LG Electronics, "Emergency call and voice call service in migration scenario", S2-166554, SA WG2 Meeting #118,Reno, Nevada, USA, Agenda Item 6.10.18 (revision of S2-16xxxx), Nov. 14-18, 2016, 4 pages.

PCT/US2018/037084, International Search Report and Written Opinion, dated Nov. 21, 2018, 20 pages.

* cited by examiner

SYSTEMS, METHODS AND DEVICES FOR LEGACY SYSTEM FALLBACK IN A CELLULAR COMMUNICATIONS SYSTEM

RELATED APPLICATION

This application claims the benefit under 35 U.S.C. § 119(e) of U.S. Provisional Application No. 62/518,846 filed Jun. 13, 2017, which is hereby incorporated by reference herein in its entirety.

TECHNICAL FIELD

The present disclosure relates to cellular communications and more specifically to enable user equipment (UEs) to fallback to a legacy system from a fifth generation system (5GS).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and the NG-RAN (NextGen RAN) implements the NR RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG), policy and charging rules function (PCRF) and/or a mobility management entity (MME). A 5G core network can include an access and management mobility function (AMF), authentication server function (AUSF), unified data function (UDM), session management function (SMF), user plane function (UPF), policy control function (PCF), application function (AF) and data network (DN). In some mixed networks one or more systems can be combined. For example, combinations can include: PCF+PCRF, PGW-C+SMF, HSS+UDM and UPF+PGW-U.

A 5G System (5GS) includes NextGen RAN (NG RAN) and 5G Core (5GC).

DETAILED DESCRIPTION

Figure 1:
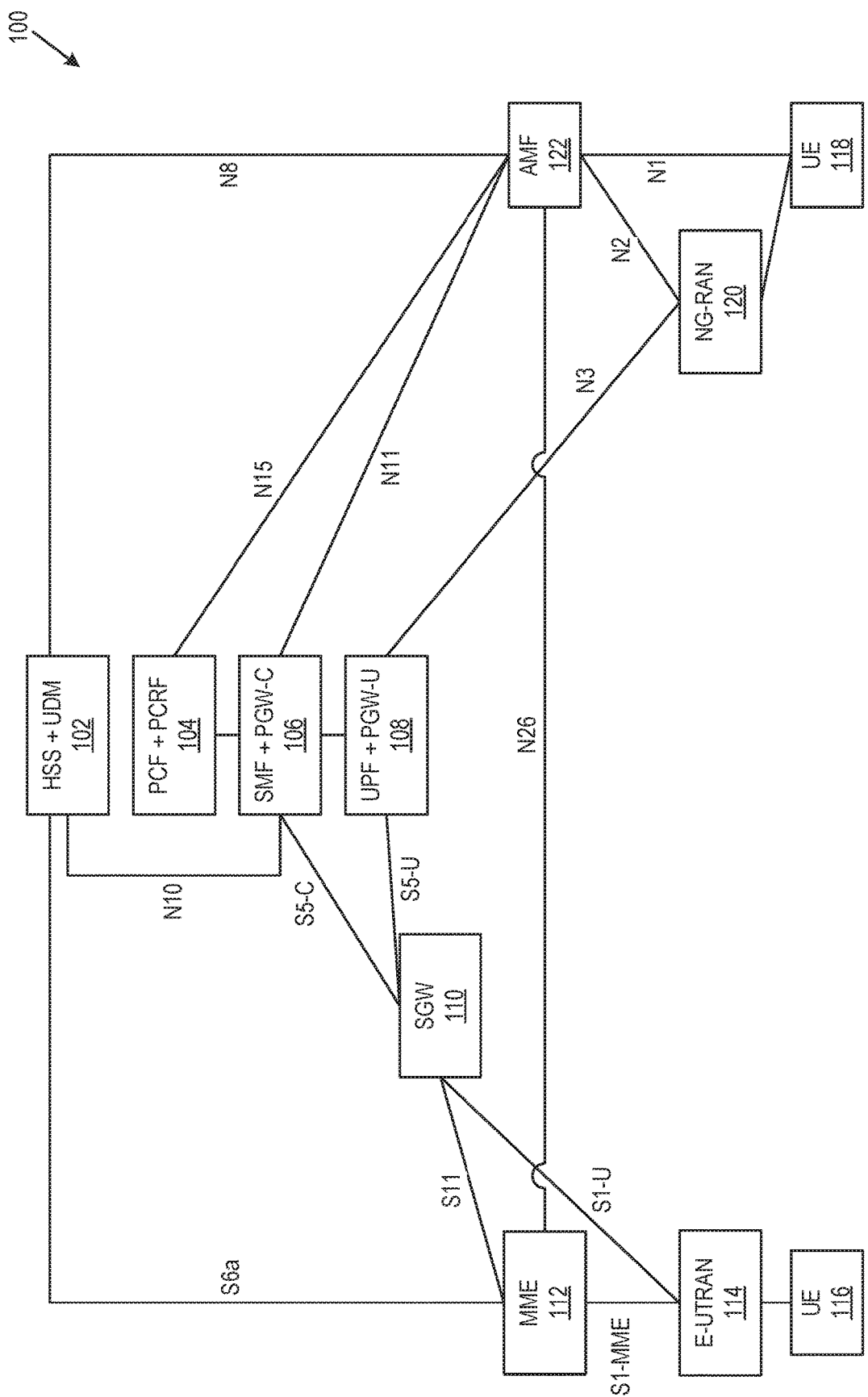
FIG. 1 is a diagram illustrating an architecture for interworking between a 5GS and EPC/E-UTRAN consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable user equipment (UEs) to fallback to a legacy system, such as an evolved packet system (EPS), from a fifth generation system (5GS). For example, a UE camps on the 5GS network by default. When an indicator of a voice call is detected, the UE performs a fallback to EPS for a duration of the voice call. After the voice call, the UE can return to the 5GS. In another example, the UE detects an emergency session request (e.g., internet protocol multimedia subsystem (IMS) emergency session request). The UE performs a fallback to EPS for a duration of the emergency session. After the emergency session is complete, the UE can return to the 5GS. The solution can operate with UEs that operate in either Single Registration (SR) mode embodiments or Dual Registration (DR) mode embodiments. Depending on the embodiment, the UE can perform a handover or redirection to the legacy system (such as E-UTRAN).

Embodiments of solutions for support of voice centric UEs in a 5G system to fallback to a legacy system are disclosed. The 5G system is an all-IP system, which can support Voice over the IP Multimedia Subsystem (VoIMS). However, in some cases, it may be preferable to keep VoIMS communication in the legacy system (Evolved Packet System—EPS) for one or more reasons. For example, the frequency bands in the 5G system may not be suitable for good support of voice communications (e.g., the coverage in the millimeter wavelength may be varying very quickly). In another example, the 5G coverage may be spotty, leading to frequent inter-system handovers. In yet another example, there can be a lack of support for regulatory services in the 5G system (e.g., no support for emergency calls).

One prior assumption for voice domain selection is as follows: A UE set to "voice centric for 5GS" shall always try to ensure that voice service is possible. A voice centric 5GC capable UE unable to obtain voice service in 5GS shall not select NR and E-UTRAN cell connected to 5GC by disabling related radio capabilities, which results in re-selecting to E-UTRAN connected to EPC first (if available). When the UE selects E-UTRAN connected to EPC, the UE performs Voice Domain Selection procedures.

According to the assumption, when a "voice centric" UE (e.g., smartphone) is facing a 5GC network that advertises no support for VoIMS, the UE disables its 5G radio (NR) capability and reselects to EPS (4G). This means that in 5GS network deployments with no VoIMS support the smartphones will never be able to benefit from the higher data rates of the 5GS.

Embodiments herein relate to a different technique whereby the UE camps on the 5GS network by default and performs a fallback to EPS for a duration of the voice call. The solution works with UEs that operate in either Single Registration (SR) or Dual Registration (DR) mode.

For UE operating in SR mode, control of stickiness on the RAN-CN interface may include several principles. In one embodiment, when UE intends to make a Mobile Originated (MO) call or when UE receives an IMS message (e.g., SIP INVITE) indicating a Mobile Terminated (MT) call, the UE sends a 5G NAS message (e.g., [5G NAS] Service Request) indicating that it requires EPC fallback for MO or MT call. Based on this request the 5GS triggers a handover or RRC redirection towards the EPS. Note that session initiation protocol (SIP) signaling can be exchanged in parallel to the handover procedure. For the duration of the voice call in EPS the E-UTRAN is configured to not trigger any handback to 5GS. The presence of a voice call is signaled with an explicit indication or is deduced by the presence of QCI=1 bearer. When the voice call is over in EPS the E-UTRAN triggers a handback to the 5G system. The trigger for handback is the absence of bearer with QCI=1 or with an explicit indication.

For UE operating in DR mode (Alternative 1; multi-access packet data network connectivity (MAPCON) based), control of stickiness on the RAN-CN interface may include several principles. In one embodiment, when UE intends to make a Mobile Originated (MO) call or when UE receives an IMS message (e.g., SIP INVITE) indicating a Mobile Terminated (MT) call, the UE transfers the protocol data unit (PDU) Session carrying IMS traffic (IMS PDU Session) to the EPS by using the UE initiated packet data network (PDN) connection establishment procedure with "handover" indication. To minimize the probability for loss of SIP signaling messages during the PDU Session transfer procedure, the UE may delay the transmission of the SIP INVITE (MO call) or the SIP acknowledge (ACK) message (MT call) until the IMS PDN Connection is established on the EPS side. Depending on the UE's radio capability (single radio vs. dual radio) the UE may transfer to EPS any additional PDU sessions that it has. When the voice call is over, the UE transfers the IMS PDN Connection towards 5GS.

For UE operating in DR mode (Alternative 2; network-based interne protocol flow mobility (NBIFOM) based), control of stickiness on the RAN-CN interface may include several principles. In one embodiment, the UE establishes the IMS PDU Session (IMS PDN Connection) as a multi-access PDU Session (PDN Connection). In absence of voice call the UE sends all traffic via 5G access. When UE intends to make a Mobile Originated (MO) call or when UE receives an IMS message (e.g., SIP INVITE) indicating a Mobile Terminated (MT) call, the UE starts using EPS access for sending uplink traffic. A combined PGW/UPF node in the network is configured to route downlink packets towards the access that was last used by UE for uplink packets. When the voice call is over, the UE starts using the 5G access again for uplink data, and the network follows accordingly for downlink traffic.

These embodiments allows voice-centric UEs (e.g., smartphones) to benefit from higher bitrates in the 5G system in absence of voice calls while supporting voice calls on LTE.

FIG. 1 is a diagram illustrating an architecture 100 for interworking between a 5GS and EPC/E-UTRAN. Depicted in FIG. 1 is the architecture for 5G-4G interworking between 5G System (5GS) and the Evolved Packet System (EPS). In the embodiment shown, a UE 116 is connected to E-UTRAN 114. The E-UTRAN 114 is connected to PGW-C+SMF 106, HSS+UDM 102, and UPF+PGW-U 108 through SGW 110 and MME 112. MME 112 can communicate with AMF 122 over interface N26. N26 interface is an inter-CN interface between the MME 112 and 5GS AMF 122 in order to enable interworking between EPC and the NG core. Support of N26 interface in the network is optional for interworking. N26 supports a subset of the functionalities (essential for interworking) that are supported over S10. HSS+UDM 102 and PCF+PCRF 104 can also support E-UTRAN 114 and UE 116.

In the embodiment shown, a UE 118 is connected to NG-RAN 120 and AMF 122. Through the NG-RAN 120 and AMF 122, UE 118 is connected to PCF+PCRF 104, PGW-C+SMF 106, HSS+UDM 102, and UPF+PGW-U 108. AMF 122 can communicate with MME 112 over interface N26. HSS+UDM 102 and PCF+PCRF 104 can also support NG-RAN 120 and UE 118.

PCF+PCRF 104, PGW-C+SMF 106, and UPF+PGW-U 108 are dedicated for interworking between 5GS and EPC, which are optional and are based on UE and network capabilities. UEs that are not subject to 5GS and EPC interworking may be served by entities not dedicated for interworking, i.e., either by PGW/PCRF or SMF/UPF/PCF.

The N26 reference point (connecting AMF and MME) is used for UEs operating in Single Registration (SR) mode for the purpose of handover preparation and context exchange between the two systems. Mobility between the two systems is carried out using conventional handover and Tracking Area Update for UE in Connected and Idle mode, respectively.

A UE operating in Dual Registration (DR) mode is simultaneously registered in both systems and handles two independent mobility management state machines. Mobility between the systems is performed by transferring a PDU Session (PDN Connection) from one system to another. This is similar to the MAPCON (multi-access PDN connectivity) feature to support transfer of PDN connections between 3GPP and non-3GPP access connected to the EPC.

In some embodiments, it can be possible for UE to have a multi-access PDN Connection or PDU Session having two connections (sometimes referred to as "legs"), established over EPS and 5GS access each, while converging on a common PGW/UPF. In this case the granularity for traffic transfer between the two accesses is equal to an IP flow (this is similar to the Network Based IP Flow Mobility—NBIFOM feature defined in Rel-13).

Embodiments herein may depend on the UE mode of operation: SR, DR with PDU Session mobility (à la MAPCON) or DR with IP flow mobility (à la NBIFOM).

Figure 2:
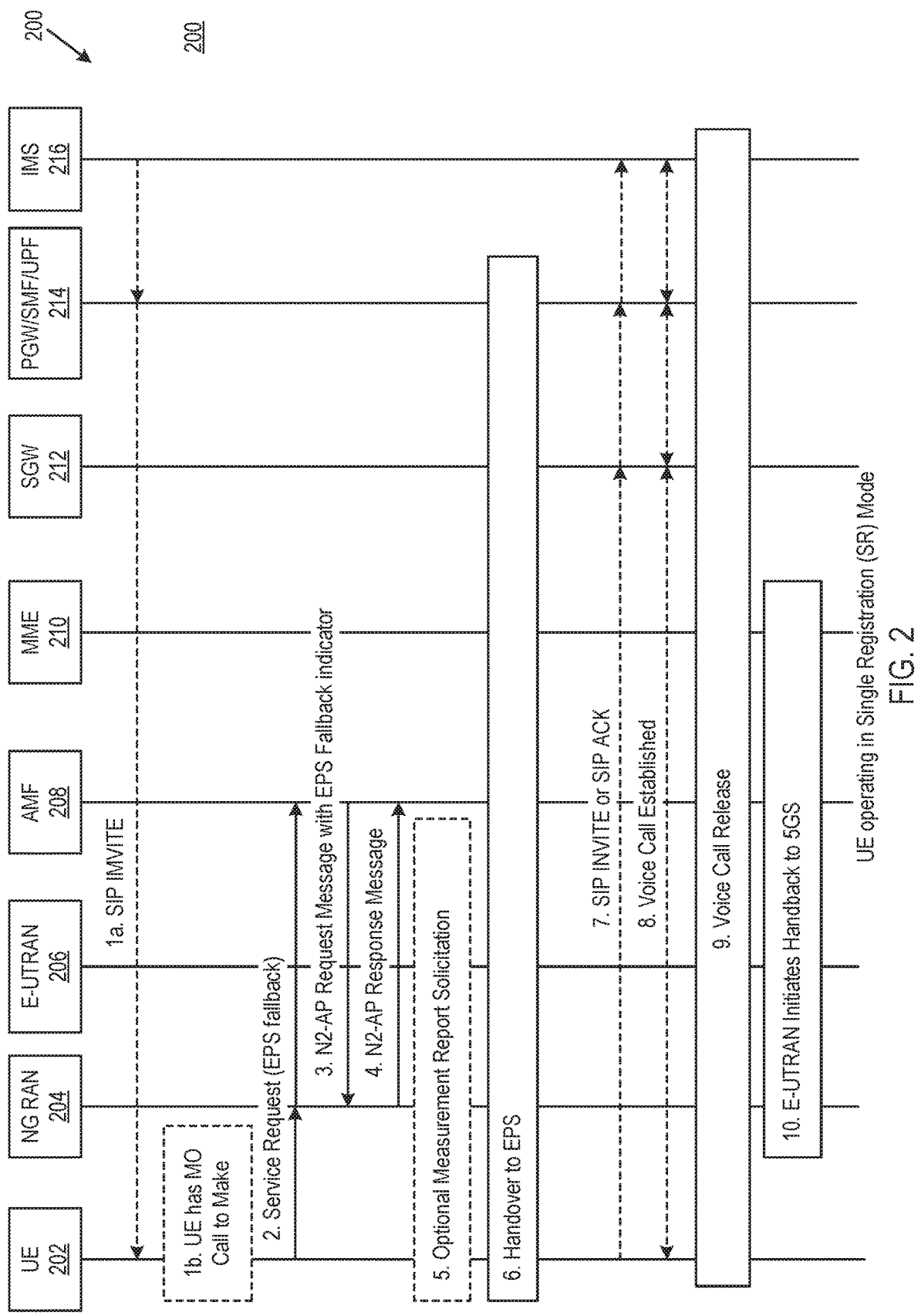
FIG. 2 is a ladder diagram illustrating a communication process of fallback of a UE operating in Single Registration (SR) mode consistent with embodiments disclosed herein.

FIG. 2. is a ladder diagram illustrating a communication process of fallback of a UE operating in Single Registration (SR) mode. The system can include UE 202, NG-RAN 204, E-UTRAN 206, AMF 208, MME 210, SGW 212, PGW/SMF/UPF 214 and IMS 216. The process can be performed by a system such as the one described in FIG. 1.

The process can be accomplished through operations, such as those shown in FIG. 2. For example, in operation 1a, while connected to 5GS the UE 202 receives an IMS message (e.g., SIP INVITE) indicating a Mobile Terminated (MT) call. In operation 1b, while connected to 5GS, UE 202 has a pending MO call request from the upper layers (i.e., the IMS client). In operation 2, based on either of the previous two triggers, the UE 202 sends a 5G NAS message to AMF 208 (e.g., [5G NAS] Service Request) indicating that it requires EPS fallback for the MO or MT call. In operations 3 and 4, the 5GS triggers a handover towards EPS by executing an N2-AP procedure in which it indicates to NG RAN 204 that this is a handover for EPS fallback (such as through communication between NG-RAN 204 and AMF 208). In operation 5, NG RAN 204 optionally solicits measurement reports for target E-UTRAN cells. In operation 6, a 5GS to EPS handover is executed. At this point the user plane path for PDU Sessions switches towards EPS. Note that in some embodiments, instead of performing handover it is also possible for 5GS to trigger an RRC Release with Redirection procedure. In operation 7, the UE 202 sends a SIP INVITE (MO call) to SGW 212, PGW/SMF/UPF 214 and/or IMS 216 or acknowledges the SIP INVITE received from the network (MT call) to SGW 212, PGW/SMF/UPF 214 and/or IMS 216. Note that SIP signaling can be exchanged in parallel to the handover procedure. However, if lossless handover is not supported, the UE may delay this step until handover completion, in order to avoid any loss of SIP messages. In operation 8, a voice call is established in EPS. For the duration of the voice call in EPS, the E-UTRAN is configured to not trigger any handback to 5GS. The presence of a voice call is signaled either with an explicit indication in S1 signaling or is deduced by the presence of a QCI=1 bearer. In operation 9, the voice call is released using SIP signaling and the corresponding EPS bearer for voice media is released. In operation 10, when the voice call is over in EPS, the E-UTRAN 206 triggers a handback to the 5G system. The trigger for handback can be the absence of a radio access bearer associated with QCI=1 or with an explicit indication.

In some embodiments, the UE operates in Dual Registration (DR) mode with PDU Session mobility. When UE intends to make a Mobile Originated (MO) call or when UE receives an IMS message (e.g., SIP INVITE) indicating a Mobile Terminated (MT) call, the UE transfers the PDU Session carrying IMS traffic (IMS PDU Session) to the EPS by using the UE initiated PDN connection establishment procedure with "handover" indication. Depending on the embodiment, before initiating transfer of the PDU Session, the UE may send an access stratum message to the NG RAN so that it is not perceived as going out of coverage by the NG RAN. To minimize a probability for loss of SIP signaling messages during the PDU Session transfer procedure the UE may delay the transmission of the SIP INVITE (MO call) or the SIP ACK message (MT call) until the IMS PDN Connection is established on the EPS side. Depending on the UE's radio capability (single radio vs. dual radio) the UE may transfer to EPS any additional PDU Sessions that it has. When the voice call is over the UE transfers the IMS PDN Connection towards 5GS.

For either of the solutions listed above the 5GS indicates to UE using NAS signaling whether it supports "EPS fallback." If the 5GS indicates no support for "EPS fallback," the UE behaves without taking "EPS fallback" into consideration.

In some embodiments, the UE operates in Dual Registration (DR) mode with IP flow mobility. The UE establishes the IMS PDU Session (IMS PDN Connection) as a multi-access PDU Session (PDN Connection). In the absence of a voice call the UE sends all traffic via 5G access. When the UE intends to make a Mobile Originated (MO) call or when the UE receives an IMS message (e.g., SIP INVITE) indicating a Mobile Terminated (MT) call, the UE simply starts using EPS access for sending uplink traffic. The combined PGW/UPF node in the network is configured to route downlink packets towards the access that was last used by the UE for uplink packets. When the voice call is over the UE simply starts using the 5G access for uplink data, and the network follows accordingly for downlink traffic.

Another embodiment can be used for voice support. For example, a UE is registered to 5GS and in parallel it is registered to the Circuit Switched (CS) domain of a legacy (2G/3G) system. Calls made via the CS domain are anchored in the IMS. For routing of MT calls the Terminating Access Domain Selection (T-ADS) function in the IMS selects the CS domain of the legacy 2G/3G system or the PS domain of the 5GS, as defined by configured policies. For routing of MO calls the UE selects the CS domain of the legacy 2G/3G system or the PS domain of the 5GS, as defined by configured policies. If the UE needs to transfer the voice call between the CS domain of the legacy 2G/3G system and the PS domain of the 5GS, the UE uses the PS-CS Access Transfer procedures for Dual Radio Voice Call Continuity (DRVCC).

Figure 3:
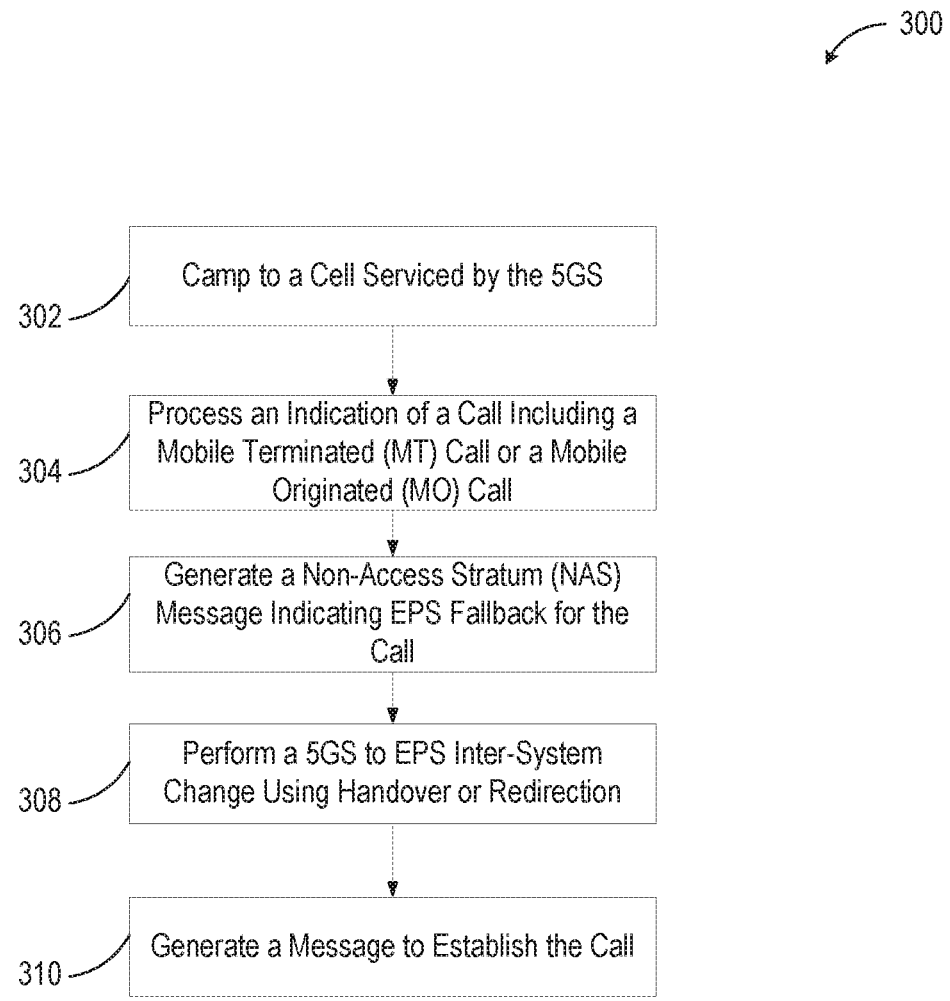
FIG. 3 is a flow chart illustrating a method for fallback to a legacy system consistent with embodiments disclosed herein.

FIG. 3 is a flow chart illustrating a method for fallback to a legacy system. The method can be accomplished by systems, such as those shown in FIG. 1, including UE 118, NG-RAN 120, E-UTRAN 114, AMF 122 and MME 112, among others. In block 302, a UE camps to a cell serviced by a 5GS. In block 304, the UE processes an indication of a call including a mobile terminated (MT) call or a mobile originated (MO) call. In block 306, the UE generates a non-access stratum (NAS) message indicating EPS fallback for the call. In block 308, the UE performs a 5GS to EPS inter-system change using handover or redirection. In block 310, the UE generates a message to establish the call.

Figure 4:
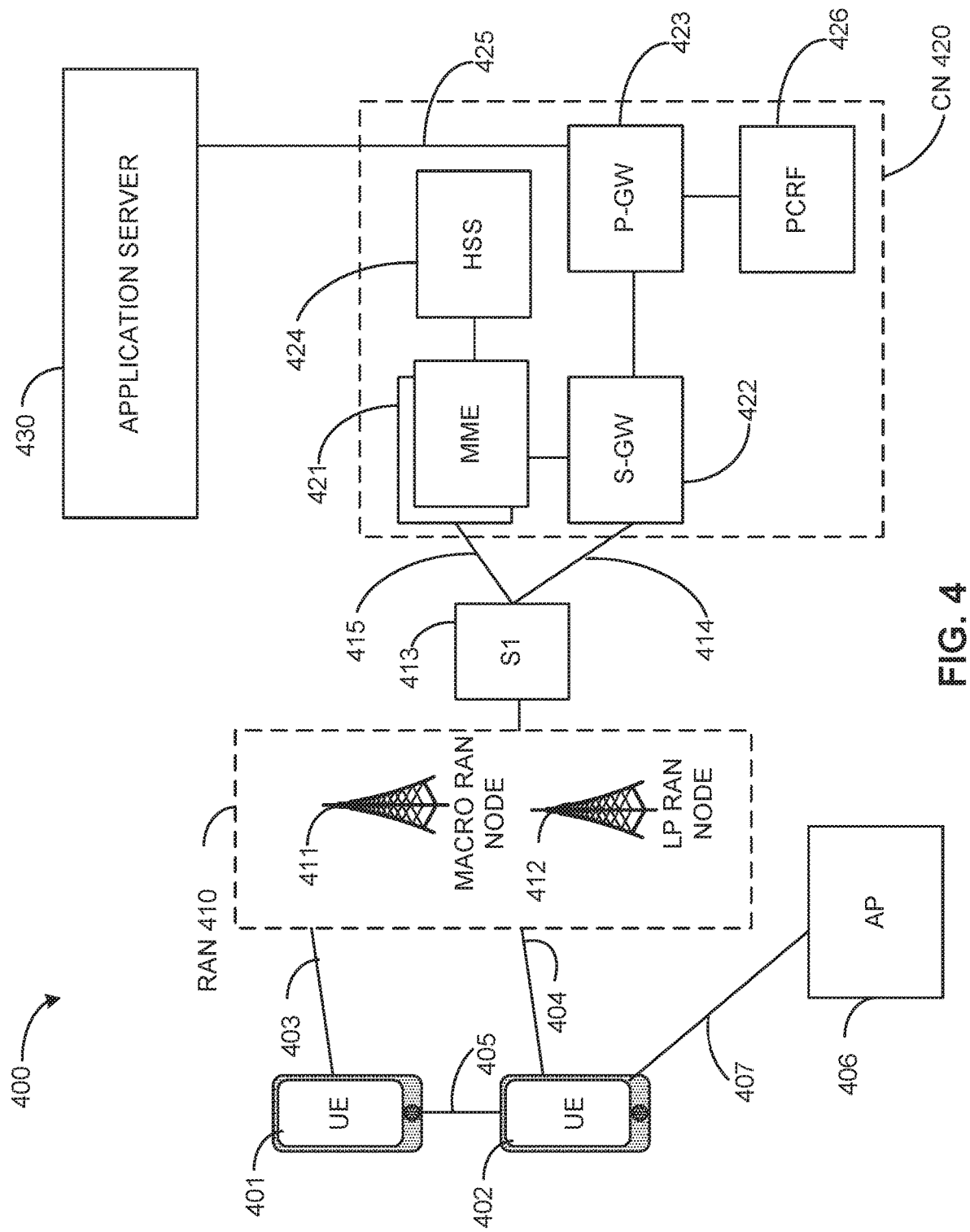
FIG. 4 illustrates an architecture of a system of a network consistent with embodiments disclosed herein.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410. The RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 may be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 402 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and a serving gateway (S-GW) 422, and an S1-mobility management entity (MME) interface 415, which is a signaling interface between the RAN nodes 411 and 412 and MMEs 421.

In this embodiment, the CN 420 comprises the MMEs 421, the S-GW 422, a Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the CN 420 (e.g., an EPC network) and external networks such as a network including the application server 430 (alternatively referred to as application function (AF)) via an Internet Protocol (IP) interface 425. Generally, an application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. A Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
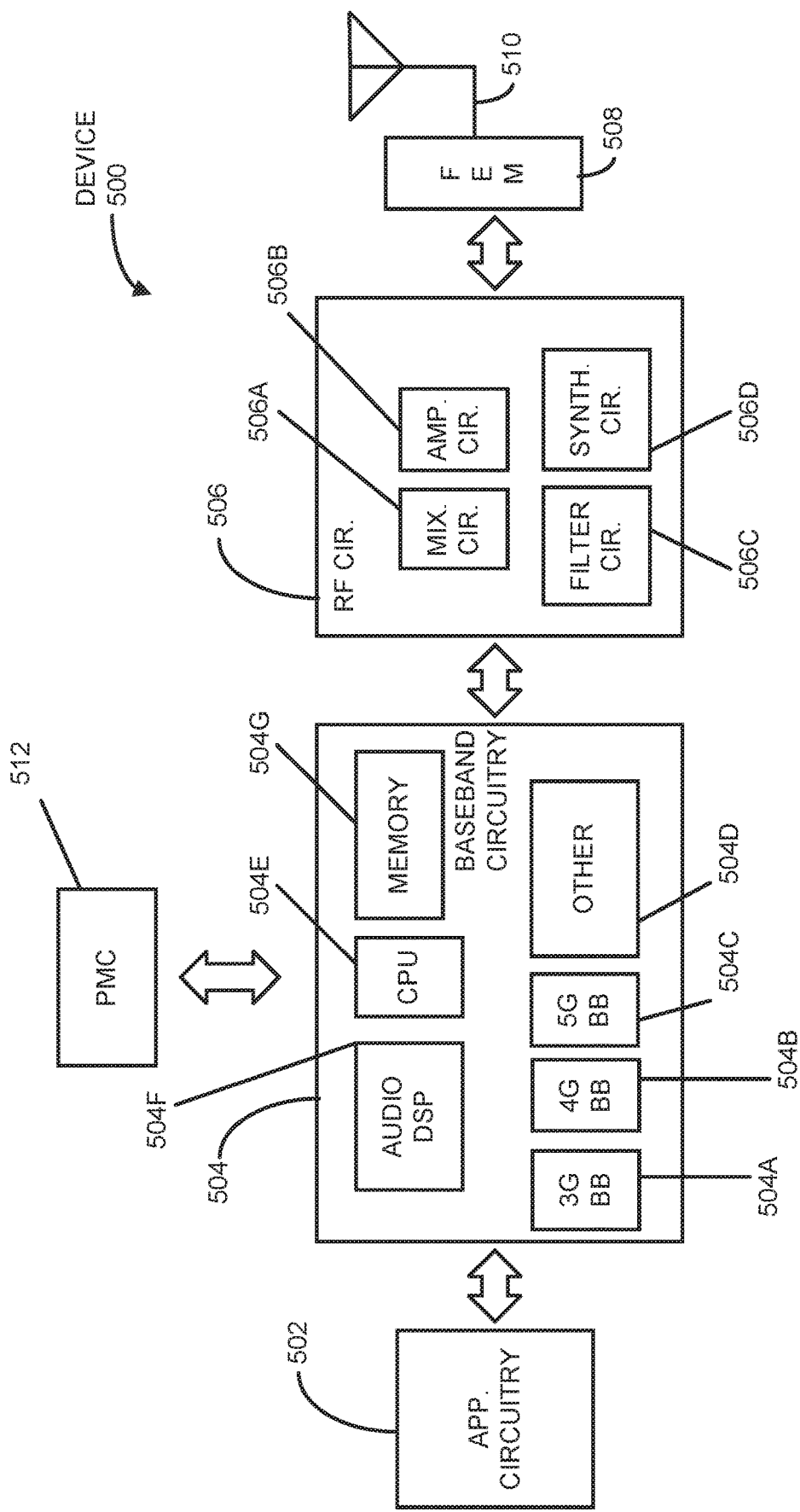
FIG. 5 illustrates example components of a device consistent with embodiments disclosed herein.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. The RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506A, amplifier circuitry 506B and filter circuitry 506C. In some embodiments, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 506A of the receive signal path may comprise passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 504 and may be filtered by the filter circuitry 506C.

In some embodiments, the mixer circuitry 506A of the receive signal path and the mixer circuitry 506A of the transmit signal path may include two or more mixers and may be arranged for quadrature downconversion and upconversion, respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer comprising a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 502 (such as an applications processor) depending on the desired output frequency. In some embodiments, a divider control input (e.g., N) may be determined from a look-up table based on a channel indicated by the application circuitry 502.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. The FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM circuitry 508, or in both the RF circuitry 506 and the FEM circuitry 508.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by the RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device 500 is included in a UE. The PMC 512 may increase the power conversion efficiency while providing desirable implementation size and heat dissipation characteristics.

FIG. 5 shows the PMC 512 coupled only with the baseband circuitry 504. However, in other embodiments, the PMC 512 may be additionally or alternatively coupled with, and perform similar power management operations for, other components such as, but not limited to, the application circuitry 502, the RF circuitry 506, or the FEM circuitry 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
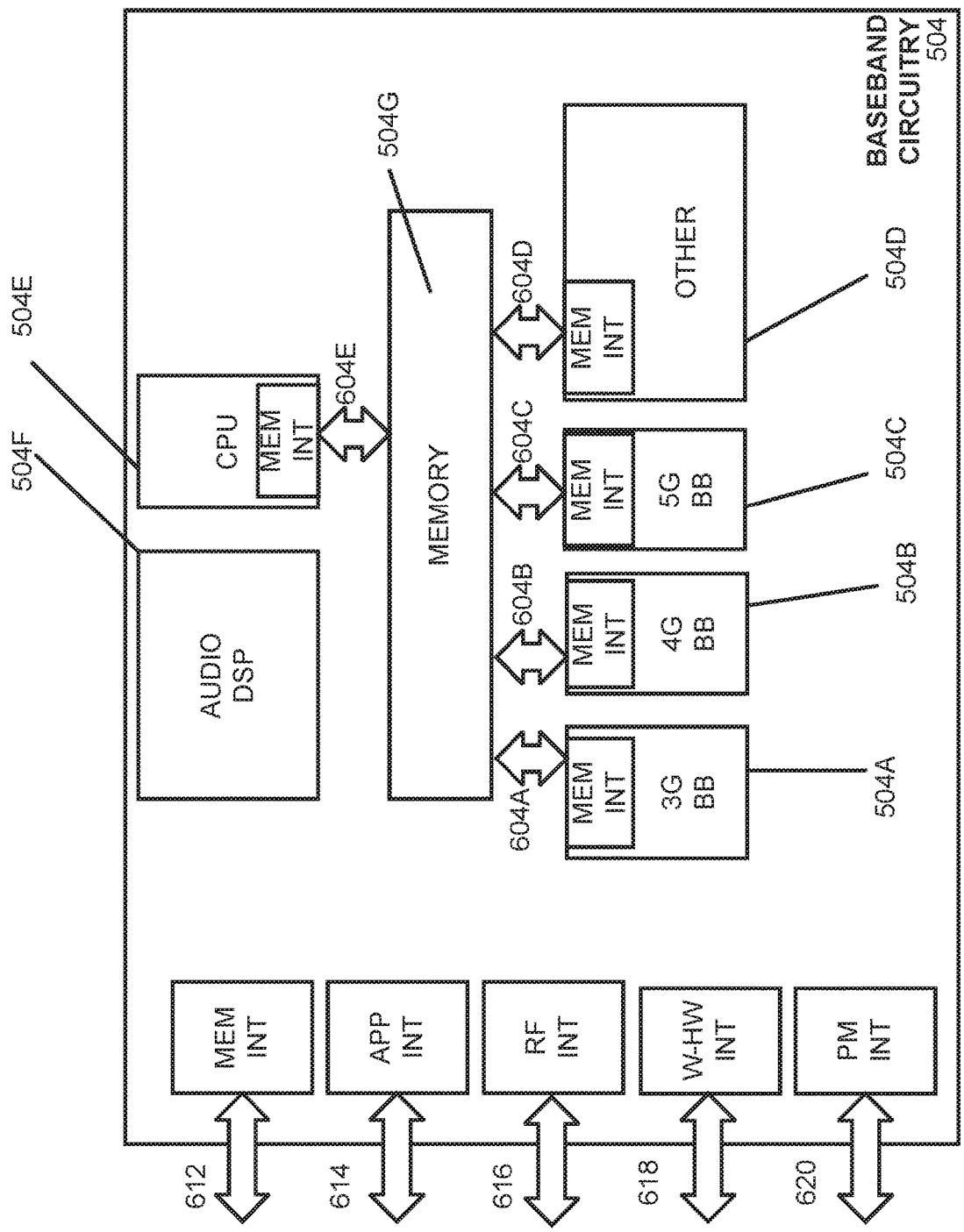
FIG. 6 illustrates example interfaces of baseband circuitry consistent with embodiments disclosed herein.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

Figure 7:
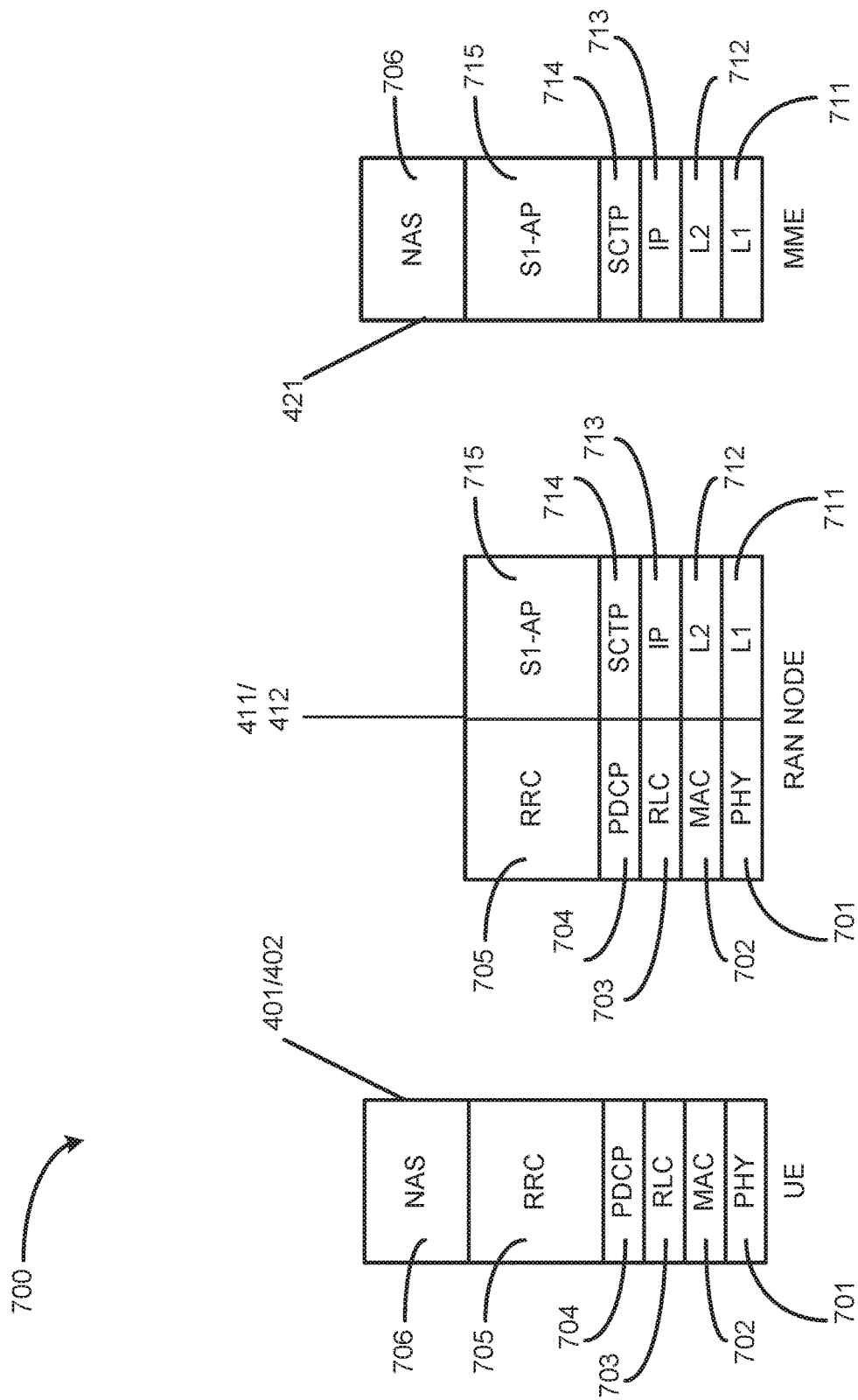
FIG. 7 is an illustration of a control plane protocol stack consistent with embodiments disclosed herein.

FIG. 7 is an illustration of a control plane protocol stack in accordance with some embodiments. In this embodiment, a control plane 700 is shown as a communications protocol stack between the UE 401 (or alternatively, the UE 402), the RAN node 411 (or alternatively, the RAN node 412), and the MME 421.

A PHY layer 701 may transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as an RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 401 and the RAN node 411 may utilize a Uu interface (e.g., an LTE-Uu interface) to exchange control plane data via a protocol stack comprising the PHY layer 701, the MAC layer 702, the RLC layer 703, the PDCP layer 704, and the RRC layer 705.

In the embodiment shown, the non-access stratum (NAS) protocols 706 form the highest stratum of the control plane between the UE 401 and the MME 421. The NAS protocols 706 support the mobility of the UE 401 and the session management procedures to establish and maintain IP connectivity between the UE 401 and the P-GW 423.

The S1 Application Protocol (S1-AP) layer 715 may support the functions of the S1 interface and comprise Elementary Procedures (EPs). An EP is a unit of interaction between the RAN node 411 and the CN 420. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 714 may ensure reliable delivery of signaling messages between the RAN node 411 and the MME 421 based, in part, on the IP protocol, supported by an IP layer 713. An L2 layer 712 and an L1 layer 711 may refer to communication links (e.g., wired or wireless) used by the RAN node and the MME to exchange information.

The RAN node 411 and the MME 421 may utilize an S1-MME interface to exchange control plane data via a protocol stack comprising the L1 layer 711, the L2 layer 712, the IP layer 713, the SCTP layer 714, and the S1-AP layer 715.

Figure 8:
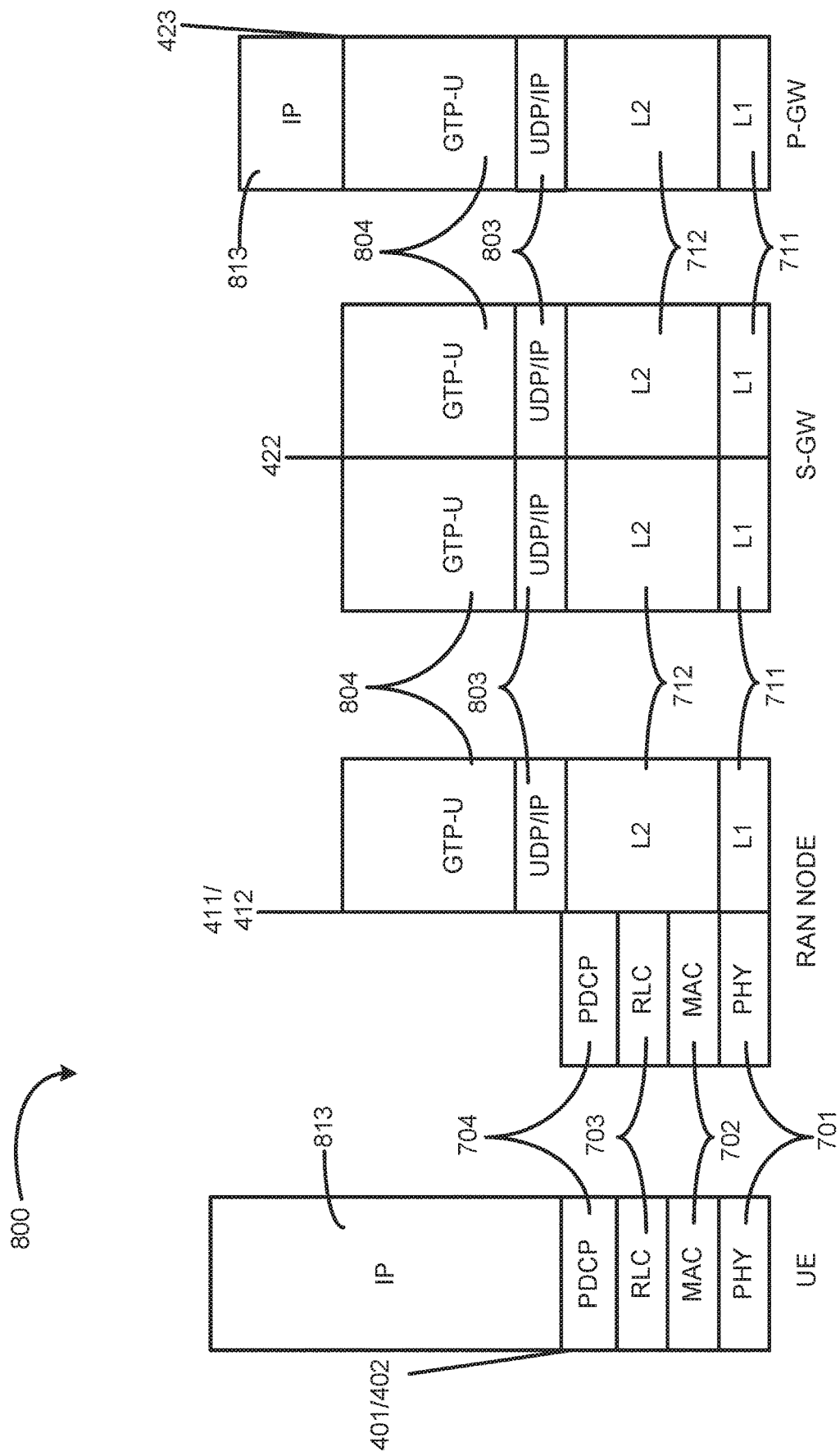
FIG. 8 is an illustration of a user plane protocol stack consistent with embodiments disclosed herein.

FIG. 8 is an illustration of a user plane protocol stack in accordance with some embodiments. In this embodiment, a user plane 800 is shown as a communications protocol stack between the UE 401 (or alternatively, the UE 402), the RAN node 411 (or alternatively, the RAN node 412), the S-GW 422, and the P-GW 423. The user plane 800 may utilize at least some of the same protocol layers as the control plane 700. For example, the UE 401 and the RAN node 411 may utilize a Uu interface (e.g., an LTE-Uu interface) to exchange user plane data via a protocol stack comprising the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 411 and the S-GW 422 may utilize an S1-U interface to exchange user plane data via a protocol stack comprising the L1 layer 711, the L2 layer 712, the UDP/IP layer 803, and the GTP-U layer 804. The S-GW 422 and the P-GW 423 may utilize an S5/S8a interface to exchange user plane data via a protocol stack comprising the L1 layer 711, the L2 layer 712, the UDP/IP layer 803, and the GTP-U layer 804. As discussed above with respect to FIG. 7, NAS protocols support the mobility of the UE 401 and the session management procedures to establish and maintain IP connectivity between the UE 401 and the P-GW 423.

Figure 9:
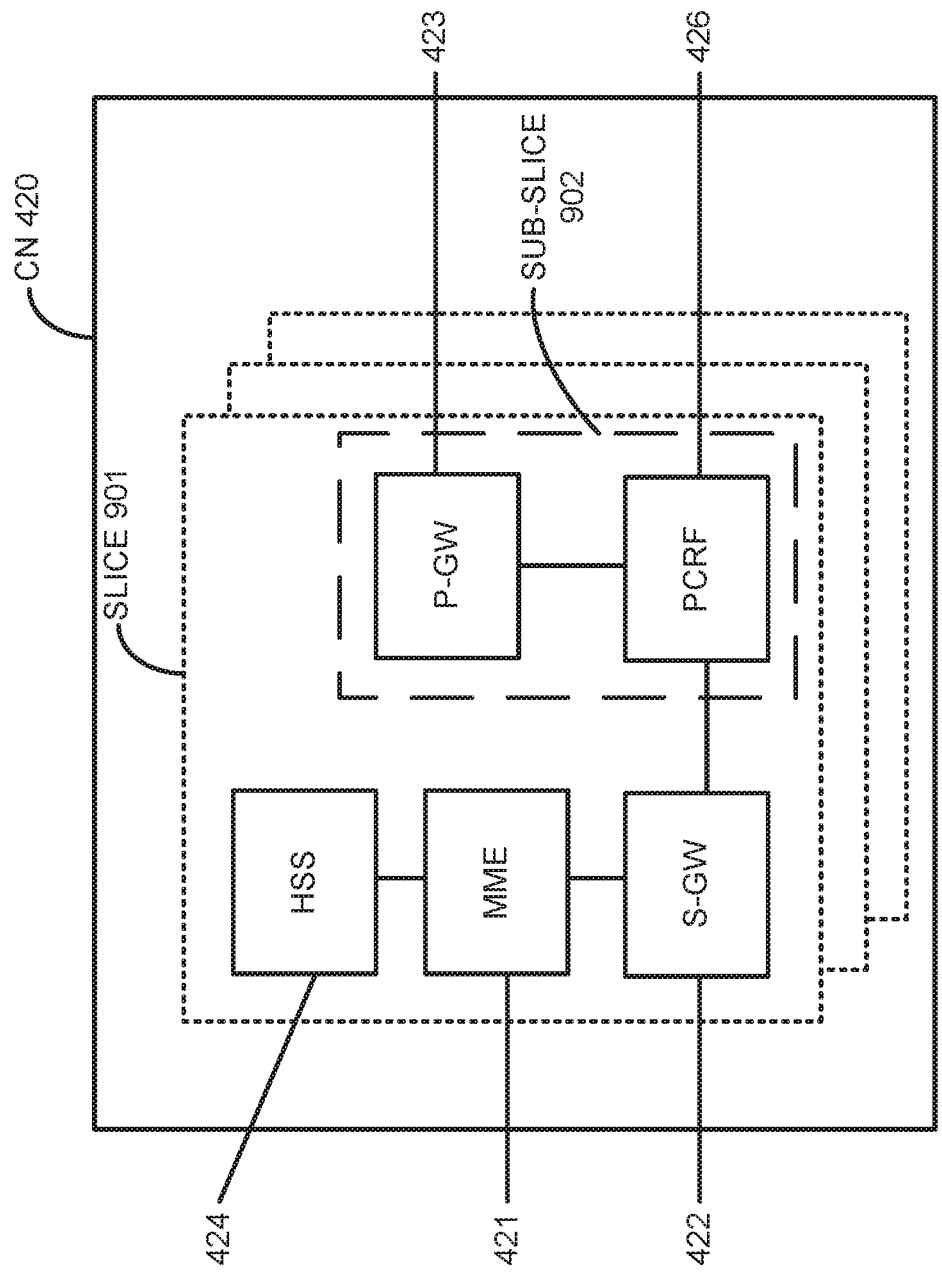
FIG. 9 illustrates components of a core network consistent with embodiments disclosed herein.

FIG. 9 illustrates components of a core network in accordance with some embodiments. The components of the CN 420 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 420 may be referred to as a network slice 901. A logical instantiation of a portion of the CN 420 may be referred to as a network sub-slice 902 (e.g., the network sub-slice 902 is shown to include the PGW 423 and the PCRF 426).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
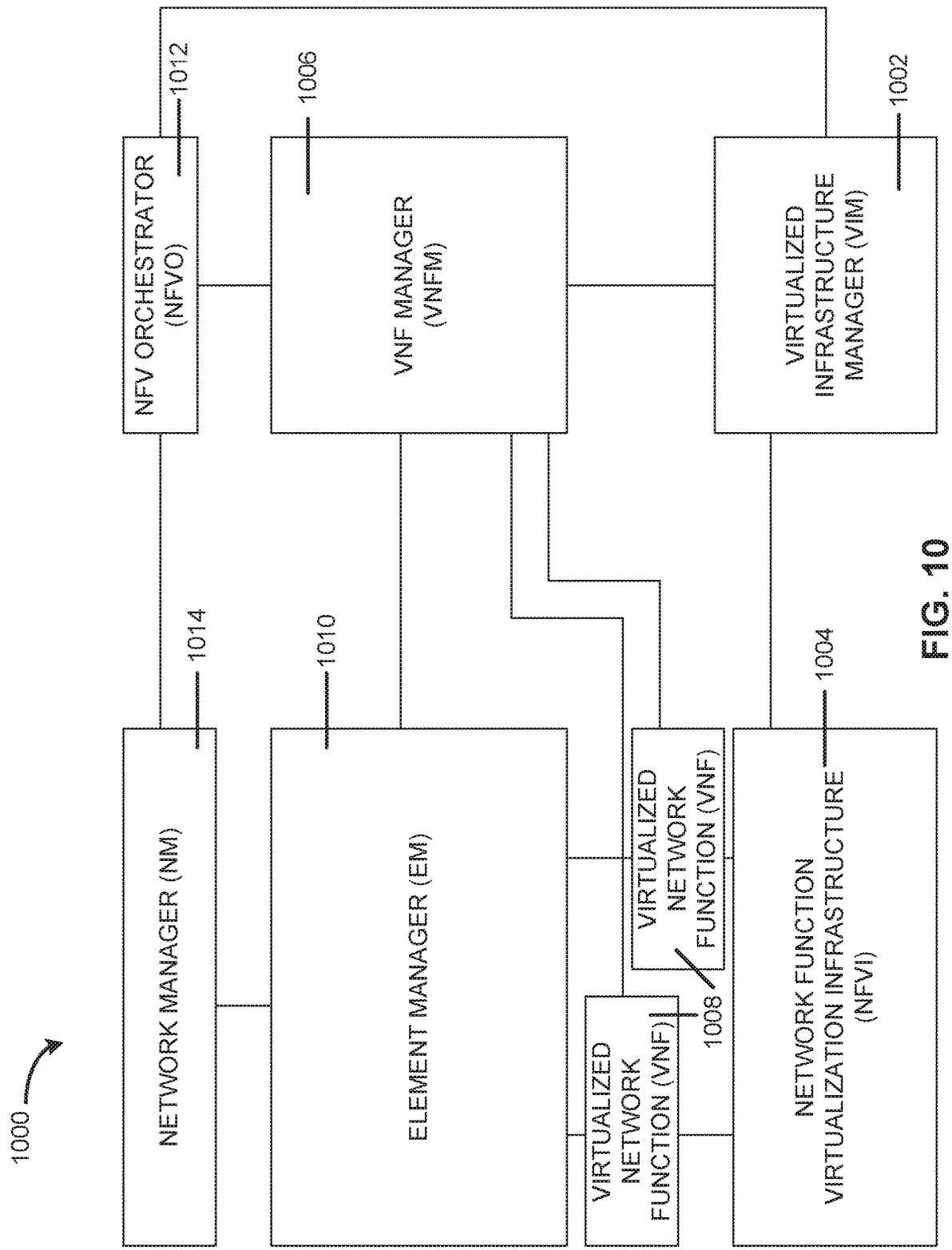
FIG. 10 is a block diagram illustrating components of a system to support network functions virtualization (NFV).

FIG. 10 is a block diagram illustrating components, according to some example embodiments, of a system 1000 to support NFV. The system 1000 is illustrated as including a virtualized infrastructure manager (VIM) 1002, a network function virtualization infrastructure (NFVI) 1004, a VNF manager (VNFM) 1006, virtualized network functions (VNFs) 1008, an element manager (EM) 1010, an NFV Orchestrator (NFVO) 1012, and a network manager (NM) 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1006 may manage the VNFs 1008. The VNFs 1008 may be used to execute EPC components/functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, performance measurement (PM) data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Figure 11:
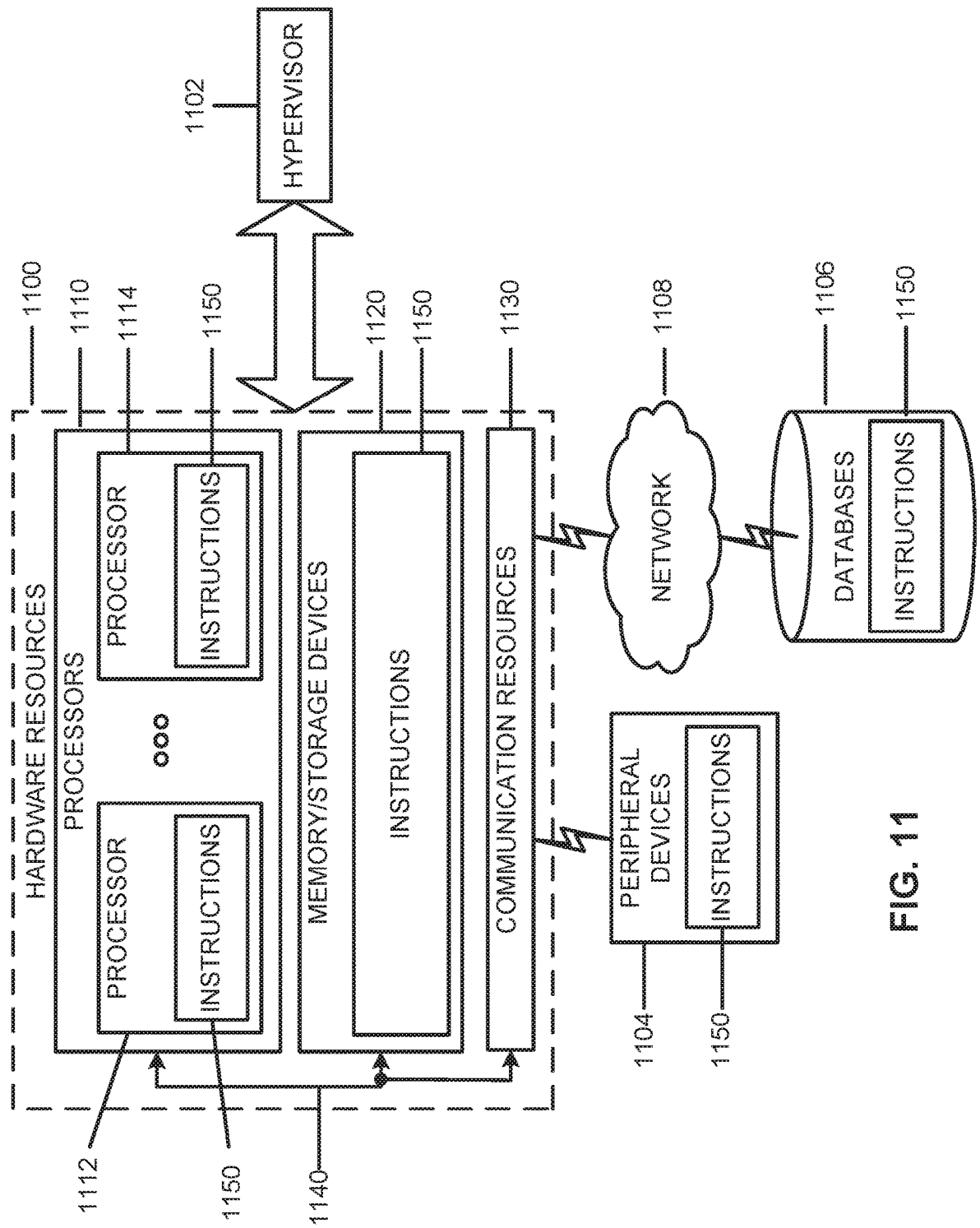
FIG. 11 is a block diagram illustrating components able to read instructions from a machine-readable or computer-readable medium and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

EXAMPLES

The following examples pertain to further embodiments.

Example 1 is an apparatus for a user equipment (UE), comprising: a wireless interface configured to couple with an evolved universal terrestrial radio access (E-UTRA) cell or new radio (NR) cell; a processor coupled to the wireless interface, the processor configured to: camp on the E-UTRA cell or NR cell serviced by a first core network that does not support a voice session; process an indication of a voice session request; generate service request message indicating a fallback request; perform a handover or redirection to an evolved universal mobile telecommunications system terrestrial radio access network (E-UTRAN) cell serviced by a second core network that supports the voice session; and generate a message to establish a protocol data unit (PDU) session or packet data network (PDN) connection for the voice session.

Example 2 is the apparatus of Example 1, wherein the wireless interface is configured to couple with the 5GS or evolved packet system (EPS) without coupling to both simultaneously.

Example 3 is the apparatus of any of Examples 1-2, wherein the wireless interface is configured to couple with the 5GS and evolved packet system (EPS) using a dual-registration mode.

Example 4 is the apparatus of any of any of Examples 1-3, wherein the voice session request is a pending internet protocol multimedia subsystem (IMS) session request and the processor is further configured to perform PDU Session transfer of the PDU session carrying IMS traffic from fifth generation core (5GC) to evolved packet system core (EPC) using a UE initiated packet data network (PDN) connection establishment procedure with handover indication in a PDN Connection Request message.

Example 5 is the apparatus of any of Examples 1-4, wherein the indication of the voice session request is a pending internet protocol multimedia subsystem (IMS) emergency session request.

Example 6 is the apparatus of any of Examples 1-5, wherein the processor is further configured to process an indication of support for fallback in a registration accept message.

Example 7 is the apparatus of any of Examples 1-6, wherein the fallback request is an emergency services fallback.

Example 8 is the apparatus of any of Examples 1-7, wherein to perform the handover or redirection to a E-UTRAN cell comprises inter-system change from 5GS to evolved packet system (EPS).

Example 9 is a computer program product comprising a computer-readable storage medium that stores instructions for execution by a processor to perform operations of a cellular communication system, the operations, when executed by the processor, to perform a method, the method comprising: generate a registration accept message that includes an indication of support for fallback to an evolved packet system (EPS); process a service request message, from a user equipment (UE) configured to communicate with a cell of the cellular communication system, indicating the fallback; trigger a request for fallback by executing a next generation application protocol (NG-AP) procedure in which the procedure indicates to a next generation radio access network (NG-RAN) the fallback to evolved universal mobile telecommunications system terrestrial radio access network (E-UTRAN); initiate a handover or redirection of the UE to E-UTRAN.

Example 10 is the computer program product of Example 9, wherein the method further comprises to establish a protocol data unit (PDU) session or packet data network (PDN) session.

Example 11 is the computer program product of any of Examples 9-10, wherein the method further comprises to generate a Session Initiation Protocol (SIP) message to establish an internet protocol multimedia subsystem (IMS) session.

Example 12 is the computer program product of any of Examples 9-11, wherein to initiate the handover or redirection of the UE to E-UTRAN further comprises to initiate the handover or redirection to a fifth generation core (5GC)-connected E-UTRAN cell.

Example 13 is the computer program product of any of Examples 9-12, wherein to initiate the handover or redirection of the UE to E-UTRAN further comprises to initiate a handover or redirection procedure of the UE to the E-UTRAN connected to EPC.

Example 14 is the computer program product of any of Examples 13, wherein to use a security context provided by an access and mobility management function (AMF) to secure the redirection procedure.

Example 15 is the computer program product of any of Examples 9-14, wherein to process the service request message indicating the fallback further comprises to process the service request message indicating an emergency services fallback for a pending internet protocol multimedia subsystem (IMS) emergency session request.

Example 16 is the computer program product of Example 10, wherein to establish the PDU session or the PDN session further comprises to establish a voice session PDN connection in EPS.

Example 17 is a method for a user equipment (UE) to fallback to an evolved packet system (EPS) from a fifth generation system (5GS) for a voice session, comprising: camping to a cell serviced by the 5GS; processing an indication of a call including a mobile terminated (MT) call or a mobile originated (MO) call; generating a non-access stratum (NAS) message indicating EPS fallback for the call; performing a 5GS to EPS inter-system change using handover or redirection; and generating a message to establish the call.

Example 18 is the method of Example 17, wherein the message is a Session Initiation Protocol (SIP) message.

Example 19 is the method of any of Examples 17-18, further comprising registering with the 5GS and EPS using a dual-registration mode.

Example 20 is the method of any of Examples 17-19, wherein performing the 5GS to EPS inter-system change further comprises redirection to E-UTRAN connected to EPS.

Example 21 is the method of any of Examples 17-20, wherein processing the indication of the call further comprises processing the indication of a IMS emergency session request.

Example 22 is the method of any of Examples 21, wherein the IMS emergency session request is the voice session.

Example 23 is an apparatus comprising means to perform a method as any of recited in any of Examples 17-21.

Example 24 is a machine readable medium including code, when executed, to cause a machine to perform the method of any one of any of Examples 17-21.

ADDITIONAL EXAMPLES

Additional Example may include a method for handling voice over IP multimedia subsystem (VoIMS) calls for user equipment (UE) operating in Single Registration mode.

Additional Example 2 may include the method of Additional Example 1 or some other Additional Example herein, whereby UE is connected to a 5G System (5GS) that is interworked with Evolved Packet System (EPS) and indicates support for "EPS fallback."

Additional Example 3 may include the method of Additional Example 2 or some other Additional Example herein, whereby UE intends to make a Mobile Originating (MO) call or receives a session initiation protocol (SIP) signaling message indicating a Mobile Terminating (MT) call.

Additional Example 4 may include the method of Additional Example 3 or some other Additional Example herein, whereby UE sends a 5G NAS message (e.g., [5G NAS] Service Request) to a 5G Core indicating the need for "EPS fallback."

Additional Example 5 may include the method of Additional Example 4 or some other Additional Example herein, whereby the 5G Core network initiates handover to EPS using an N2-AP procedure.

Additional Example 6 may include the method of Additional Example 5 or some other Additional Example herein, whereby UE delays SIP signaling until completion of handover to EPS.

Additional Example 7 may include the method of Additional Example 6 or some other Additional Example herein, whereby E-UTRAN keeps UE in EPS for the duration of the voice call.

Additional Example 8 may include the method of Additional Example 7 or some other Additional Example herein, whereby E-UTRAN detects the presence of voice call via the presence of a radio access bearer associated with QCI=1 or an explicit S1 notification.

Additional Example 9 may include the method of Additional Example 8 or some other Additional Example herein, whereby E-UTRAN initiates handback to 5GS after completion of the voice call.

Additional Example 10 may include the method of Additional Example 9 or some other Additional Example herein, whereby the end of the voice call is deduced by the absence of a bearer associated with QCI=1 or an explicit S1 notification.

Additional Example 11 may include the method for handling voice over IP multimedia subsystem (VoIMS) calls for UE operating in Dual Registration mode.

Additional Example 12 may include the method of Additional Example 11 or some other Additional Example herein, whereby UE is connected to a 5G System (5GS) that is interworked with Evolved Packet System (EPS) and indicates support for "EPS fallback."

Additional Example 13 may include the method of Additional Example 12 or some other Additional Example herein, whereby UE intends to make a Mobile Originating (MO) call or receives a SIP signaling message indicating a Mobile Terminating (MT) call.

Additional Example 14 may include the method of Additional Example 13 or some other Additional Example herein, whereby UE transfers the PDU Session carrying IMS traffic (IMS PDU Session) to the EPS by using the UE initiated PDN connection establishment procedure with "handover" indication.

Additional Example 15 may include the method of Additional Example 13 or some other Additional Example herein, whereby UE sends an indication to the NG RAN that it is leaving prior to initiating PDN connection establishment on the EPS side.

Additional Example 16 may include the method of any of the previous Additional Examples or some other Additional Example herein, whereby UE delays the transmission of the SIP INVITE (MO call) or the SIP ACK message (MT call) until the IMS PDN Connection is established on the EPS side.

Additional Example 17 may include the method of any of the previous Additional Examples herein, whereby UE transfers the IMS PDN Connection to the 5GS upon completion of the voice call.

Additional Example 18 may include the method for handling voice over IP multimedia subsystem (VoIMS) calls for UE operating in Dual Registration mode.

Additional Example 19 may include the method of Additional Example 18 or some other Additional Example herein, whereby UE has a multi-access PDU Session (PDN Connection) for VoIMS established via 5GS access and EPS access in parallel.

Additional Example 20 may include the method of Additional Example 19 or some other Additional Example herein, whereby UE intends to make a Mobile Originating (MO) call or receives a SIP signaling message indicating a Mobile Terminating (MT) call.

Additional Example 21 may include the method of Additional Example 20 or some other Additional Example herein, whereby UE starts using EPS access for all uplink packets belonging to the VoIMS media stream.

Additional Example 22 may include the method of Additional Example 21 or some other Additional Example herein, whereby the network is to route downlink packets towards the access that was last used by UE for uplink packets.

Additional Example 23 may include the method for handling voice over IP multimedia subsystem (VoIMS) calls for UE operating in Dual Registration mode.

Additional Example 24 may include the method of Additional Example 23 or some other Additional Example herein, whereby UE is registered with the CS domain of a legacy (2G or 3G) system, in parallel to being registered to 5GS.

Additional Example 25 may include the method of Additional Example 24 or some other Additional Example herein, whereby calls made via the CS domain are anchored in the IMS.

Additional Example 26 may include the method of Additional Example 25 or some other Additional Example herein, whereby for routing of MT calls the IMS selects the CS domain of the 2G/3G legacy system or the PS domain of the 5GS, as defined by configured policies.

Additional Example 27 may include the method of Additional Example 25 or some other Additional Example herein, whereby for routing of MO calls the UE selects the CS domain of the 2G/3G legacy system or the PS domain of the 5GS, as defined by configured policies.

Additional Example 28 may include the method of Additional Examples 23 to 27 or some other Additional Example herein, whereby the UE uses the PS-CS Access Transfer procedures for DRVCC to transfer the voice call between the CS domain of the 2G/3G legacy system or the PS domain of the 5GS.

Additional Example 29 may include an apparatus comprising means to perform one or more elements of a method described in or related to any of Additional Examples 1-28, or any other method or process described herein.

Additional Example 30 may include one or more non-transitory computer-readable media comprising instructions to cause an electronic device, upon execution of the instructions by one or more processors of the electronic device, to perform one or more elements of a method described in or related to any of Additional Examples 1-28, or any other method or process described herein.

Additional Example 31 may include an apparatus comprising logic, modules, or circuitry to perform one or more elements of a method described in or related to any of Additional Examples 1-28, or any other method or process described herein.

Additional Example 32 may include a method, technique, or process as described in or related to any of Additional Examples 1-28, or portions or parts thereof Additional Example 33 may include an apparatus comprising: one or more processors and one or more computer readable media comprising instructions that, when executed by the one or more processors, cause the one or more processors to perform the method, techniques, or process as described in or related to any of Additional Examples 1-28, or portions thereof.

Additional Example 34 may include a signal as described in or related to any of Additional Examples 1-28, or portions or parts thereof.

Additional Example 35 may include a signal in a wireless network as shown and described herein.

Additional Example 36 may include a method of communicating in a wireless network as shown and described herein.

Additional Example 37 may include a system for providing wireless communication as shown and described herein.

Additional Example 38 may include a device for providing wireless communication as shown and described herein.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus for a user equipment (UE), comprising:
a wireless interface configured to couple to transceiver circuitry configured to couple with an evolved universal terrestrial radio access (E-UTRA) cell or new radio (NR) cell;
a processor coupled to the wireless interface, the processor configured to:
cause the UE to camp on the E-UTRA cell or NR cell serviced by a first core network;
process an indication of a voice session request;

generate a service request message indicating a fallback request;
perform a handover or redirection to an evolved universal mobile telecommunications system terrestrial radio access network (E-UTRAN) cell serviced by a second core network that supports a voice session;
generate a message to establish a protocol data unit (PDU) session or packet data network (PDN) connection for the voice session; and
send the message to the wireless interface,
wherein the voice session request is a pending internet protocol multimedia subsystem (IMS) session request and
the processor is further configured to perform a PDU Session transfer of the PDU session carrying IMS traffic from a fifth generation core (5GC) to an evolved packet system core (EPC) using a UE initiated PDN connection establishment procedure with a handover indication in a PDN Connection Request message.

2. The apparatus of claim 1, wherein the wireless interface is configured to couple with a fifth generation system (5GS) or an evolved packet system (EPS) without coupling to both simultaneously.

3. The apparatus of claim 1, wherein the wireless interface is configured to couple with a fifth generation system (5GS) and an evolved packet system (EPS) using a dual-registration mode.

4. The apparatus of claim 1, wherein the processor is further configured to process an indication of support for fallback in a registration accept message.

5. The apparatus of claim 1, wherein the fallback request is an emergency services fallback.

6. The apparatus of claim 1, wherein to perform the handover or redirection to a E-UTRAN cell comprises the inter-system change from a fifth generation system (5GS) to an evolved packet system (EPS).

7. A method for a user equipment (UE) to fallback to an evolved packet system (EPS) from a fifth generation system (5GS) for a voice session, comprising:
camping to a cell serviced by the 5GS;
processing an indication of a call including a mobile terminated (MT) call or a mobile originated (MO) call;
generating a non-access stratum (NAS) message indicating EPS fallback for the call;
performing a 5GS to EPS inter-system change using handover or redirection; and
generating a message to establish the call,
wherein the indication of the call is a pending internet protocol multimedia subsystem (IMS) session request and
the method further comprises performing a protocol data unit (PDU) Session transfer of a PDU session carrying IMS traffic from a fifth generation core (5GC) to an evolved packet system core (EPC) using a UE initiated packet data network (PDN) connection establishment procedure with a handover indication in a PDN Connection Request message.

8. The method of claim 7, wherein the message is a Session Initiation Protocol (SIP) message.

9. The method of claim 7, further comprising registering with the 5GS and EPS using a dual-registration mode.

10. The method of claim 7, wherein performing the 5GS to EPS inter-system change further comprises redirection to E-UTRAN connected to EPS.

11. The method of claim 7, wherein processing the indication of the call further comprises processing the indication of a IMS emergency session request.

12. The method of claim 11, wherein the IMS emergency session request is the voice session.

* * * * *